United States Patent [19]

St. Clair et al.

[11] Patent Number: 4,595,548

[45] Date of Patent: Jun. 17, 1986

[54] PROCESS FOR PREPARING ESSENTIALLY COLORLESS POLYIMIDE FILM CONTAINING PHENOXY-LINKED DIAMINES

[75] Inventors: Anne K. St. Clair; Terry L. St. Clair, both of Poquoson, Va.

[73] Assignee: The United States of America as represented by the Administrator of the National Aeronautics and Space Administration, Washington, D.C.

[21] Appl. No.: 643,524

[22] Filed: Aug. 23, 1984

[51] Int. Cl.$^4$ ................................................ B29D 7/24
[52] U.S. Cl. ...................................... 264/236; 264/204; 264/216; 264/347; 528/222; 528/341; 528/183
[58] Field of Search ............... 264/204, 236, 216, 347; 528/183, 170, 179, 188, 189, 341, 229, 322, 331, 222

[56] References Cited

U.S. PATENT DOCUMENTS 4,214,071 7/1980 Alvino et al. ..................... 528/222
4,473,523 9/1984 Sasaki et al. ..................... 264/204

*Primary Examiner*—Jeanette Hunter
*Attorney, Agent, or Firm*—Howard J. Osborn; John R. Manning; Wallace J. Nelson

[57] ABSTRACT

An aromatic condensation polyimide film that is approximately 90% transparent at 500 nm, useful for thermal protective coatings and the like, and the processes for preparing same by thermal and chemical conversion are disclosed. An essential feature of the invention for achieving maximum optical transparency films requires utilizing recrystallized and/or sublimated specific aromatic diamines and dianhydride monomers and introducing phenoxy or thiophenyl separator groups and isomeric m,m'- or o,p'-oriented diamines into the polymer molecular structure. The incorporation of these groups in the polymer structure serves to separate the chromaphoric centers and reduce the formation of inter-chain and intra-chain charge transfer complexes which normally cause absorptions in the UV-visible range. The films may be obtained by hand, brushing, casting or spraying a layer of the polyamic acid solutions onto a surface and thermally converting the applied layer to the polyimide or the polyamic acid solution can be chemically converted to the polyimide, subsequentially dissolved in an organic solvent, and applied as a polyimide film layer with the solvent therein thermally removed.

17 Claims, No Drawings

PROCESS FOR PREPARING ESSENTIALLY COLORLESS POLYIMIDE FILM CONTAINING PHENOXY-LINKED DIAMINES

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

Linear aromatic condensation polyimide film is a material of choice for use in many aerospace as well as commercial applications where long term durability at temperatures in the range of 200°–300° C. are needed and where shorter times at temperatures exceeding 300° C. are necessary. Because of their inherent toughness and flexibility, low density, remarkable thermal stability, radiation resistance and mechanical strength, aromatic polyimide films have excellent potential for use as materials on large space structures.

The need exists for high temperature, flexible polymeric film and coating materials that have high optical transparency in the the 300–600 nm range of the electromagnetic spectrum for applications on such space components as antennae, solar cells and thermal control coating systems. Although there are available several classes of polymers which are transparent/colorless such as polyesters or aliphatic polyimides, these materials have limited long term thermal stability. A major drawback for using the thermally stable aromatic polyimides for the above stated space applications has been their poor transparency in the visible range of the electromagnetic spectrum. Traditionally, linear all-aromatic condensation polyimides are known for their bright yellow color. Commercial aromatic polyimide film has been evaluated for applications on space solar cells and thermal control coating systems but was found to be only about 70% transparent (depending on thickness) at the solar wavelength of interest (500 nm). A further drawback for using the intensely colored aromatic polyimides as space films or coatings is that although they are approximately 70% transparent, upon aging in a space environment they become even less transparent (as low as 30% transparent).

By the present invention, aromatic condensation polyimide films are produced which are essentially colorless to totally colorless. These materials provide 90% transparency at the visible wavelength of 500 nm compared to 60–70% transparency for commercial polyimide film of the same thickness. It is anticipated that these optically transparent/achromatic films will prove highly useful as film and coating materials for aerospace applications where high transparency and thermal stability are necessary criteria. This improvement in transparency has been made without sacrificing other advantageous polymer properties.

Accordingly, an object of the present invention is to provide a process for increasing the optical transparency of linear aromatic condensation polyimide film.

Another object of the present invention is to provide a process for preparing aromatic polyimides for use as films and/or coatings having improved optical transparency at wavelengths in the visible region of the electromagnetic spectrum useful for transmitting solar energy as needed in such applications as solar cell covers or second surface mirror coatings in thermal control coating systems.

A further object of the present invention is an aromatic polyimide having improved optical transparency.

BRIEF DESCRIPTION OF THE INVENTION

According to the present invention, the foregoing and additional objects are attained by providing a method by which linear aromatic condensation polyimide films are made highly optically transparent (90% transparent at 500 nm). The process for producing optically transparent aromatic polyimide films according to the present invention involves two conditiions: (1) purification of both aromatic diamine and aromatic dianhydride monomers and the solvent used as a medium; and (2) separation and/or removal of chromaphoric centers and reduction of both inter- and intra-chain electronic interactions which cause absorption in the UV-visible region by introducing phenoxy or thiophenyl, "separator" groups and isomeric (m,m'- or o,p'-oriented) diamines into the polymer molecular structure. Both of these conditions must be used simultaneously or concurrently to produce polyimide films with maximum optical transparency according to the present invention.

In regard to the first condition, at least one recrystallization and/or sublimation of the aromatic diamine and dianhydride monomers was necessary to prevent impure starting materials from discoloring the final polyimide film. It was also necessary to use distilled solvent as a reaction medium. The solvent employed is selected from either N,N-dimethylacetamide, N,N'-dimethylformamide, N-methyl-2-pyrrolidone, or dimethylsulfoxide, or a mixture of two or more of these solvents.

The second condition necessary for providing maximum optical transparency includes the use of oxygen or sulfur linkages in the form of phenoxy or thiophenyl units as "separator" groups which reduce the overall conjugation in the polymer chain. In the present invention, these separator groups are used together with isomeric meta- or o,p'-oriented aromatic diamines which distort polymer chain packing enough to significantly reduce charge transfer complex formation causing decrease in optical absorption.

Preparation of highly optically transparent polyimide film of the present invention involves the conventional reaction of an aromatic diamine in a solvent with an aromatic dianhydride but with highly purified monomers and molecular structures according to the following:

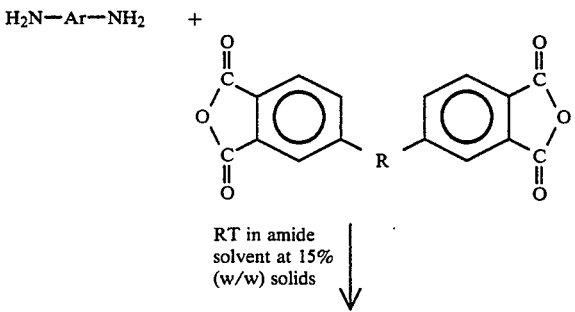

RT in amide
solvent at 15%
(w/w) solids

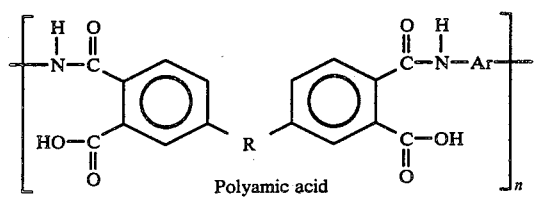

Polyamic acid

Thermal cure (250°–300° C.)

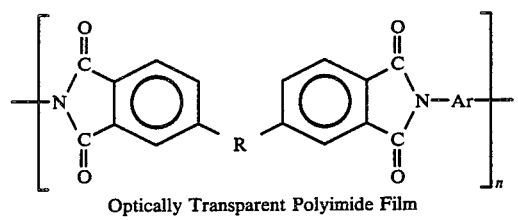

Optically Transparent Polyimide Film where n = 5 to 100;

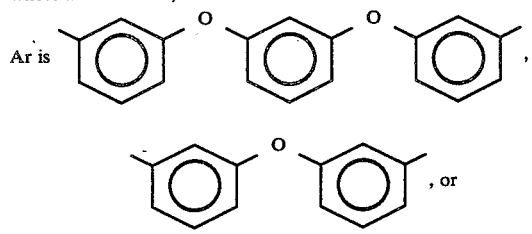

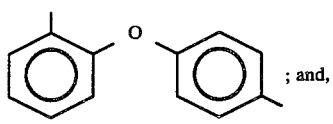

; and,

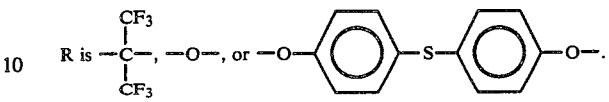

In the above reaction, a highly purified aromatic diamine is dissolved in a distilled amide-type solvent such as dimethylacetamide (DMAc). A highly purified dianhydride is then added to the diamine solution at room temperature to form a polyamic acid. This resin is then spread onto a glass plate to form a film using a doctor blade with specified blade gap. The polyamic acid film is then thermally converted to the polyimide by heating to 300° C.

All of the highly optically transparent polyimide films of the present invention have meta- or o,p'-oriented aromatic diamines and phenoxy or thiophenyl groups in their molecular structure. However, the combination of such diamines with specific aromatic dianhydrides according to the present invention produces new and unobvious essentially colorless films. For example, combination of the meta-oriented diamine APB or m,m'-ODA with 6F, ODPA or BDSDA dianhydride of the present invention will produce an essentially colorless film (Tables I and II). Combination of these diamines with other dianhydrides, however, does not necessarily produce a colorless film.

TABLE I

Aromatic Polyimide Films Containing APB Diamine

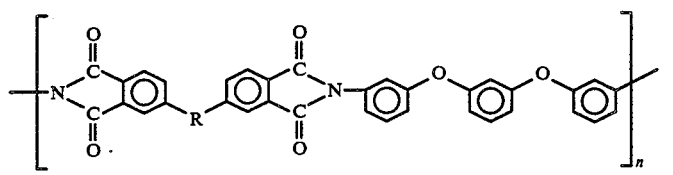

where n = 5 to 100

| Polymer | Dianhydride R | Physical Appearance (0.2 mil Film) |
|---|---|---|
| 6F + APB | —C(CF$_3$)$_2$— | Essentially Colorless |
| ODPA + APB | —O— | Essentially Colorless |
| BDSDA + APB | —O—⟨⟩—S—⟨⟩—O— | Essentially Colorless |
| BTDA + APB | —C(O)— | Bright Yellow |

TABLE II

Aromatic Polyimide Films Containing m,m'-ODA Diamine $$\left[-N\overset{\underset{\|}{C}=O}{\underset{\underset{\|}{C}=O}{\diagup}}R\overset{\underset{\|}{C}=O}{\underset{\underset{\|}{C}=O}{\diagdown}}N-\bigcirc-O-\bigcirc-\right]_n$$

where n = 5 to 100

| Polymer | Dianhydride R | Physical Appearance (0.2 mil Film) |
|---|---|---|
| 6F + m,m'-ODA | –⌬–C(CF₃)(CF₃)–⌬– | Essentially Colorless |
| ODPA + m,m'-ODA | –⌬–O–⌬– | Essentially Colorless |
| BDSDA + m,m'-ODA | –⌬–O–⌬–S–⌬–O–⌬– | Essentially Colorless |
| BTDA + m,m'-ODA | –⌬–C(=O)–⌬– | Bright Yellow |
| PMDA + m,m'-ODA | –⌬– | Light Yellow |

Although the combination of 6F and BDSDA dianhydrides with o,p'-ODA produced pale yellow colored films, only the combination of ODPA+o,p'-ODA produced a colorless polyimide film (Table III).

TABLE III

Aromatic Polyimide Films Containing o,p'-ODA Diamine $$\left[-N\overset{\underset{\|}{C}=O}{\underset{\underset{\|}{C}=O}{\diagup}}R\overset{\underset{\|}{C}=O}{\underset{\underset{\|}{C}=O}{\diagdown}}N-\bigcirc-O-\bigcirc-\right]_n$$

where n = 5 to 100

| Polymer | Dianhydride R | Physical Appearance (0.2 mil Film) |
|---|---|---|
| ODPA + o,p'-ODA | –⌬–O–⌬– | Essentially Colorless |

TABLE III-continued
Aromatic Polyimide Films Containing o,p'-ODA Diamine

*[structure shown: polyimide repeat unit with R dianhydride and o,p'-ODA diamine]* where n = 5 to 100

| Polymer | Dianhydride R | Physical Appearance (0.2 mil Film) |
|---|---|---|
| 6F + o,p'-ODA | hexafluoroisopropylidene diphenyl (CF$_3$-C-CF$_3$ bridge) | Pale Yellow |
| BDSDA + o,p'-ODA | bis(phenoxyphenyl)sulfide structure | Pale Yellow |
| BTDA + o,p'-ODA | benzophenone (C=O bridge) | Bright Yellow |
| PMDA + o,p'-ODA | single phenyl ring | Brown/Yellow |
| BFDA + o,p'-ODA | bis(phenoxyphenyl)hexafluoroisopropylidene | Brown/Yellow |

In Table IV, the colorless polyimide films ODPA+o,p'-ODA and ODPA+m,m'-ODA of the present invention are compared with other polyimides of similar structure. A subtle change in structure from o,p'- or m,m'-ODA to the para-oriented diamine produces a brightly colored yellow film which is undesirable according to the present invention. Combination of ODPA dianhydride with other o,p'- or m,m'-oriented diamines which do not contain the oxygen linkages necessary to the present invention likewise produced bright or dark-colored films.

TABLE IV
Aromatic Polyimide Films Containing ODPA and Isomeric Diamines

*[structure shown: ODPA-based polyimide repeat unit with diamine X linkage]* where n = 5 to 100

| Polymer | Diamine X | Physical Appearance (0.2 mil Film) |
|---|---|---|
| ODPA + o,p'-ODA | —O— | Essentially Colorless |
| ODPA + m,m'-ODA | —O— | Essentially Colorless |
| ODPA + p,p'-ODA | —O— | Yellow |
| ODPA + o,p'-MDA | —CH$_2$— | Yellow |
| oDPA + m,m'-MDA | —CH$_2$— | Dark Yellow |
| ODPA + o,p'-DABP | —C(O)— | Dark Yellow |

Similarly, the colorless polyimides of 6F+m,m'-ODA and BDSDA+m,m'-ODA of the present invention are compared to other polyimides in Table V. Combination of 6F dianhydride with p,p'-ODA or meta-oriented diamines other than m,m'-ODA of the present invention produced pale to yellow-colored films. The same phenomena are shown for BDSDA films.

TABLE V
Aromatic Polyimide Films Containing 6F and BDSDA Dianhydrides with Isomeric Diamines where n = 5 to 100

| Polymer | Dianhydride R | Diamine X | Physical Appearance (0.2 mil Film) |
|---|---|---|---|
| 6F + m,m'-ODA | =C(CF$_3$)$_2$— | —O— | Essentially Colorless |
| 6F + p,p'-ODA | —C(CF$_3$)$_2$— | —O— | Pale Yellow |
| 6F + m,m'-MDA | —C(CF$_3$)$_2$— | —CH$_2$— | Yellow |
| 6F + m,m'-DABP | —C(CF$_3$)$_2$— | —C(O)— | Pale Yellow |
| BDSDA + m,m'-ODA | —O—⟨◯⟩—S—⟨◯⟩—O— | —O— | Essentially Colorless |
| BDSDA + p,p'-ODA | —O—⟨◯⟩—S—⟨◯⟩—O— | —O— | Pale Yellow |
| BDSDA + m,m'-MDA | —O—⟨◯⟩—S—⟨◯⟩—O— | —CH$_2$— | Yellow |
| BDSDA + m,m'-DABP | —O—⟨◯⟩—S—⟨◯⟩—O— | —C(O)— | Pale Yellow |

Optical transparency of the films of the present invention was determined not only by physical appearance but by transmission UV-visible spectroscopy. Spectra of 0.2 mil thick films of the present invention showed strong absorptions with cut-offs located between 300 and 400 nm (UV region) compare to a cut-off between 450 and 500 nm (visible region) for the commercial polyimide film Kapton ® of the same thickness. The colorless polymer films of the present invention absorbed at lower wavelengths and had higher optical transparency in the visible region than do conventional yellow-colored polyimide films.

As evidenced by the UV-visible studies described above, the use of highly purified monomers containing oxygen-linked phenoxy and sulfur-linked thiophenyl groups and o,p'- or m,m'-orientation in the diamine was a successful process for reducing chromaphoric centers, conjugation and overall charge transfer complex formation in the polymer due to either or both inter- and intra-molecular electronic interactions. As a result of this process, high optical transparency was obtained for a variety of aromatic condensation polyimides. Films have been prepared by the process of the present invention which are very pale in color to essentially colorless compared to the bright yellow color of conventional/commercial aromatic polyimide film. This increased transparency in aromatic polyimides has been achieved at no sacrifice in thermal stability, flexibility, toughness, or mechanical properties. These features make the films of the present invention extremely attractive as films or coating materials for aerospace applications. They should also be useful for any other commercial applications where high optical transparency and/or thermal stability are needed requirements.

SPECIFIC EXAMPLES

Example I

To a clean, dry vessel was added 1.754 g (0.006 mole) of recrystallized 1,3-bis(aminophenoxy)benzene (APB) (m.pt. 105° C.) and 25.0 g of dimethylacetamide (DMAc) which had been vacuum distilled at 102° C. over calcium hydride. After the diamine was dissolved by stirring, 2.6654 g of recrystallized and sublimed 2,2-bis(3,4-dicarboxyphenyl)hexafluoropropane dianhydride (6F) (m.pt. 243.5° C.) was added to the reaction vessel and stirring was continued until all solid had dissolved. Melting points of monomers were determined by differential thermal analysis at 10° C./min. for this Example and subsequent Examples. Once an inherent viscosity of 1.20 dl/g was obtained, the polyamic acid solution was capped with dry nitrogen and refrigerated until used for film casting.

Films of the 6F+APB polyamic acid were prepared by casting the resin onto a soda-lime glass plate in a dust-free chamber at a relative humidity of 10%. The solution was spread by an aluminum blade with gaps set so as to ensure final film thickness ranging from 0.2–1.0 ml. The polyamic acid films on the glass plate were thermally converted to the corresponding polyimide by heating in a forced air oven for one hour each at 100° C., 200° C. and 300° C. The resulting polyimide films were removed from the glass plates after cooling to room temperature by immersion in warm water. The 6F+APB films were flexible and ranged from essentially colorless (0.2 mil thick) to a very pale yellow color (1.0 mil thick). The 6F+APB films were partly soluble in chlorinated, amide and ether solvents.

Example II

By the same method and conditions as described in Example I of the present invention, 3.1022 g (0.01 mole) of sublimed 4,4'-oxydiphthalic anhydride (ODPA) (m.pt. 224° C.) was added to 2.9234 g (0.01 mole) of APB dissolved in 34.0 g DMAc to form a polyamic acid resin having an inherent viscosity of 0.87 dl/g. Polyimide films prepared from this ODPA+APB resin were flexible and essentially colorless at 0.2 mil thick and very pale yellow in color at a thickness of 1.0 mil. The films were partly soluble in chlorinated and amide-type solvents.

Example III

By the same method and conditions as described in Example I of the present invention, 3.5734 g, (0.007 mole) of 4,4'-bis(3,4-dicarboxyphenoxy)diphenyl sulfide dianhydride (BDSDA) (m.pt. 191° C.) was added to 2.0464 g (0.007 mole) of APB dissolved in 31.8 g DMAc to form a polyamic acid resin having an inherent viscosity of 0.80 dl/g. Resulting polyimide films of the BDSDA+APB polymer ranged from essentially colorless at 0.2 mil thick to very pale yellow (1 mil) in appearance. The films were flexible and partly soluble in amide and chlorinated solvents.

Example IV

By the same method and conditions as described in Example I of the present invention, 0.3102 g (0.001 mole) ODPA (Example II) was added to 0.2002 g (0.001 mole) of o,p'-oxydianiline (o,p'-ODA) (2,4'-diaminodiphenyl ether) dissolved in 2.9 g DMAc. The o,p'-ODA monomer was obtained by extraction from a mixture of o,p'- and p,p'-ODA isomers, and was purified by distillation and recrystallization (m.pt. 74°–75° C.). The resulting polyamic acid resin had an inherent viscosity of 0.59 dl/g. Polyimide films prepared from this ODPA+o,p'-ODA resin were flexible, essentially colorless at thicknesses ranging from 0.2–1.0 mil, and soluble in chlorinated, ether or amide-type solvents.

Example V

By the same method and conditions as described in Example I of the present invention, 0.8885 g (0.002 mole) of 6F was added to 0.4005 g (0.002 mole) of vacuum distilled m,m'-oxydianiline (m,m'-ODA) (3,3'-diaminodiphenyl ether) dissolved in 7.3 g DMAc. The resulting polyamic acid resin had an inherent viscosity of 1.0 dl/g. Polyimide films prepared from this 6F+m,m'-ODA resin were flexible and varied in color from essentially colorless at 0.2 mil to a very pale yellow at 1.0 mil thick. The films were soluble in chlorinated, ether and amide-type solvents.

Example VI

By the same method and conditions as described in Example I of the present invention, 0.6204 g (0.002 mole) of ODPA (Example II) was added to 0.4005 g (0.002 mole) of m,m'-ODA (Example V) dissolved in 5.8 g DMAc to form a polyamic acid which had an inherent viscosity of 1.1 dl/g. Polyimide films prepared from this ODPA+m,m'-ODA resin were flexible and essentially colorless (0.2 mil thick) to very pale yellow in color (1.0 mil thick). The films were soluble in chlorinated and amide-type solvents.

Example VII

By the same method and conditions as described in Example I of the present invention, 1.0210 g (0.002 mole) of BDSDA (Example III) was added to 0.4005 g (0.002 mole) of m,m'-ODA (Example V) dissolved in 8.1 g DMAc to form a polyamic acid which had an inherent viscosity of 0.36 dl/g. Polyimide films prepared from this BDSDA+m,m'-ODA resin were flexible, essentially colorless (0.2 mil) to very pale yellow (1.0 mil), and soluble in chlorinated, ether and amide-type solvents.

Example VIII

As described in Example IV of the present invention, equimolar amounts of o,p'-ODA and ODPA were reacted in DMAc to form a polyamic acid resin. To this polyamic acid was added a solution of acetic anhydride (0.003 mole) and pyridine (0.003 mole) in 1 ml DMAc. After stirring eight hours at room temperature, the resulting polyimide solution was poured into freshly distilled or ionized water in a Waring blender. The fibrous polyimide precipitate was washed at least five times with freshly distilled or ionized water and thoroughly dried in vacuum for six hours at 120° C. The ODPA+o,p'-ODA polyimide solid was then dissolved in DMAc at concentration varying from 1–40% solids (w/w). Instead of DMAc, ether or chlorinated type solvents may also be employed for dissolving the polyimide solid. Films were prepared by casting the polyimide solutions onto glass plates and heating at 300° C. for one hour to remove the solvent. Solvents other than DMAc, e.g., chlorinated or ether solvents may be removed at the 100°–200° C. range. Resulting films were flexible and very pale yellow in color at 1 mil thick. The glass transition temperature of the film was 262° C. compared to 264° C. for the film prepared from the polyamic acid as in Example IV.

In each of the described Examples I–VII, the polyamic acid solutions may be employed as made, or by diluting with the same or other solvents, to be applied by hand, brush or sprayed onto a desired surface and thermally cured in the temperature range of 250°–300° C. for at least one hour to produce a highly optically transparent polyimide coating surface. In Example VIII, the polyamic acid is chemically converted to the polyimide and selections from the described concentrations of 1–40% solids (w/w) in solvent also permits application by hand, brush or spraying with subsequent heating at 100°–300° C. for at least one hour serving to remove the solvent and yield the optically transparent films.

The foregoing specific Examples are exemplary and are not to be considered as exhaustive but merely to illustrate the invention without serving as limitations thereon.

What is claimed as new and desired to be secured by Letters Patent of the United States is:

1. A method for preparing a high temperature stable, highly optically transparent-to-colorless aromatic polyimide film comprising:
chemically reacting equimolar quantities of (1) a highly purified aromatic diamine, and
(2) a highly purified aromatic dianhydride in a solvent medium to form a high molecular weight polyamic acid solution, at least one of the reacted diamine and the dianhydride containing a separator linking group in the monomer molecular structure, said separator linking group containing at least one phenoxy or thiophenyl unit, said highly purified aromatic diamine being selected from the group consisting of o,p'- and m,m-oriented aromatic diamines, said highly purified aromatic dianhydride being selected from the group consisting of 2,2-bis(3,4-dicarboxyphenyl)hexafluoropropane dianhydride, 4,4'-oxydiphthalic anhydride, and 4,4'-bis(3,4-dicarboxyphenoxy)diphenyl sulfide dianhydride, applying a controlled thickness film layer of the polyamic acid solution onto a surface, and thermally curing the applied film layer in the temperature range of 250° C. to 300° C. for at least one hour to yield the optically transparent polyimide film layer.

2. The method of claim 1 wherein the highly purified aromatic diamine is selected from the group consisting of recrystallized:
o,p'-diaminodiphenyl ether,
m,m'-diaminodiphenyl ether, and
1,3-bis(aminophenoxy)benzene.

3. The method of claim 1 wherein the solvent is distilled prior to use and is selected from one or more of the group consisting of:
N,N-dimethylacetamide,
N,N'-dimethylformamide,
N-methyl-2-pyrrolidone, and
dimethylsulfoxide.

4. The method of claim 1 wherein the applied polyamic film layer is cast onto a glass plate and the recovered cured optically transparent polyimide film is stripped from the glass for use thereof.

5. The method of claim 1 wherein the applied polyamic acid film layer is approximately 15% w/w solids and is applied by brush coating onto a surface and the cured optically transparent polyimide film layer serves as a thermal protection coating for the surface.

6. The method of claim 1 wherein the polyamic acid solution is 15% w/w solids and including the further step of diluting the polyamic acid solution by adding additional solvent thereto prior to applying a film layer thereof onto a surface and wherein the applied film layer is sprayed onto the surface and the cured resulting transparent polyimide serves as a thermal protection coating layer for the surface.

7. A high temperature stable, highly optically transparent-to-colorless aromatic polyimide film prepared according to the method of claim 1.

8. A method for preparing a high temperature stable, highly optically transparent-to-colorless aromatic polyimide film comprising:

chemically reacting equimolar quantities of
(1) a highly purified aromatic diamine, and
(2) a highly purified aromatic dianhydride in a solvent medium to form a high molecular weight polyamic acid solution, at least one of the highly purified, aromatic diamine and the highly purified aromatic dianhydride containing a separator linking group in the monomer molecular structure, said separator linking group containing at least one of phenoxy or thiophenyl units, said highly purified aromatic diamine being selected from the group consisting of o,p'- and m,m'-oriented aromatic diamines, chemically imidizing the polyamic acid solution to recover a fibrous polyimide precipitate, dissolving the polyimide precipitate in a solvent, preparing a film layer of the polyimide solution, and treating the film layer in the temperature range of 100°–300° C. for at least one hour to remove the solvent and recover a highly optically transparent film.

9. The method of claim 8 wherein the chemical imidizing step includes adding a solution of acetic anhydride and pyridine in an organic solvent to the polyamic acid solution.

10. The method of claim 9 wherein the ratio of ingredients employed in the chemical imidizing step are 0.003 mole acetic anhydride to 0.003 mole pyridine in one millileter of organic solvent.

11. The method of claim 10 wherein the organic solvent is selected from one or more of the group consisting of:
N,N'-dimethylacetamide,
N,N'-dimethylformamide,
N-methyl-2-pyrrolidone, and
dimethylsulfoxide.

12. The method of claim 8 wherein the polyimide precipitate is wash blended in freshly distilled water, and thoroughly dried for at least six hours at 120° C. prior to being dissolved in the solvent.

13. The method of claim 8 wherein the polyimide-to-solvent solutions are in the range of 1–40% solids w/w.

14. The method of claim 8 wherein the film layer is prepared by casting the polyimide solution onto a glass plate and after solvent removal stripped from the glass plate.

15. The method of claim 8 wherein the film layer is prepared by hand brushing onto a surface to provide a thermal protection coating layer on the surface after solvent removal from the film layer.

16. The method of claim 8 wherein the film layer is spray coated onto a surface to provide a thermal protection coating layer on the surface after solvent removal from the film layer.

17. A high temperature stable, highly optically transparent-to-colorless aromatic polyimide film prepared according to the method of claim 8.

* * * * *